United States Patent [19]

Copus

[11] Patent Number: 5,152,355
[45] Date of Patent: Oct. 6, 1992

[54] OPTICAL SCANNER WEIGH PLATE MOUNTING APPARATUS

[75] Inventor: Charles R. Copus, Belle Valley, Ohio

[73] Assignee: NCR Corporation, Dayton, Ohio

[21] Appl. No.: 766,996

[22] Filed: Sep. 27, 1991

[51] Int. Cl.$^5$ .................. G01G 21/00; G01G 19/00
[52] U.S. Cl. .................................. 177/128; 177/145
[58] Field of Search ............................. 177/128, 145

[56] References Cited

U.S. PATENT DOCUMENTS 4,531,598  7/1985  Kitagawa .
4,789,775  12/1988  McClain et al. .
4,986,376  1/1991  Cone .................................. 177/128

Primary Examiner—George H. Miller, Jr.
Attorney, Agent, or Firm—Paul W. Martin

[57] ABSTRACT

An optical scanner weigh plate mounting apparatus which does not include fasteners requiring removal in order to gain access to the underside of the weigh plate and to a scan module within the scanner. The weigh plate mounting apparatus includes a pair of pivot arms, a load distributing member, pivot flanges for pivotally coupling the pivot arms at their first ends to the load distributing member, pivot pins for pivotally coupling the pivot arms at their second ends to the weigh plate, and a spacer between the load distributing member and a weight measuring device within the scanner for raising the weigh plate to a position flush with a checkout counter in which the scanner is installed. The mounting apparatus provides hands-free operating positions. In a closed position, the weigh plate sits substantially parallel to and above the pivot arms. In a first opened hands-free position, the weigh plate sits against a first side of the counter to expose the underside of the weigh plate. In a second opened hands-free position, the weigh plate sits against a second side of the counter to expose the scan module.

18 Claims, 4 Drawing Sheets

OPTICAL SCANNER WEIGH PLATE MOUNTING APPARATUS

BACKGROUND OF THE INVENTION

The present invention relates to checkout counters having integral optical scanners and more specifically to an optical scanner weigh plate mounting apparatus.

Optical scanners are well known for their usefulness in retail checkout and inventory control. Optical scanners may include integral scales for weighing produce. Such scales include weigh plates which are flush with the checkout counter. The weigh plates have scanning apertures and transparent covers made of glass which collect dust. The weigh plates must be removed periodically to clean or replace the transparent covers and to remove or install scan modules.

Unfortunately, cleaning and replacement of transparent covers and removal of scan modules is difficult in known weigh plate scanners. Typically, the scanner housing must be removed to remove the weigh plate. Removal of the housing is difficult as the housing is fastened to the checkout counter using screws having limited access.

Therefore, it would be desirable to provide an optical scanner weigh plate mounting apparatus which facilitates cleaning of weigh plate surfaces and removal and installation of scan modules without requiring removal of fasteners.

SUMMARY OF THE INVENTION

In accordance with the teachings of the present invention, an optical scanner weigh plate mounting apparatus is provided. The weigh plate mounting apparatus includes a pair of pivot arms, a load distributing member, pivot flanges for pivotally coupling the pivot arms at their first ends to the load distributing member, pivot pins for pivotally coupling the pivot arms at their second ends to the weigh plate, and a spacer between the load distributing member and a weight measuring device within the scanner for raising the weigh plate to a position flush with a checkout counter in which the scanner is installed.

It is an important feature of the present invention that the weigh plate mounting apparatus includes no fasteners which require removal in order to gain access to the underside of the weigh plate and to a scan module within the scanner.

It is also an important feature of the present invention that the mounting apparatus include hands-free operating positions. In a closed position, the weigh plate sits substantially parallel to and above the pivot arms. In a first opened hands-free position, the weigh plate sits against a first side of the counter to expose the underside of the weigh plate. In a second opened hands-free position, the weigh plate sits against a second side of the counter to expose the scan module.

It is accordingly an object of the present invention to provide a weigh plate mounting apparatus for an optical scanner.

It is another object of the present invention to provide a weigh plate mounting apparatus for an optical scanner which does not include fasteners which require removal in order to gain access to the underside of the weigh plate or to a scan module within the scanner.

It is another object of the present invention to provide a weigh plate mounting apparatus for an optical scanner which includes hands-free operative positions.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
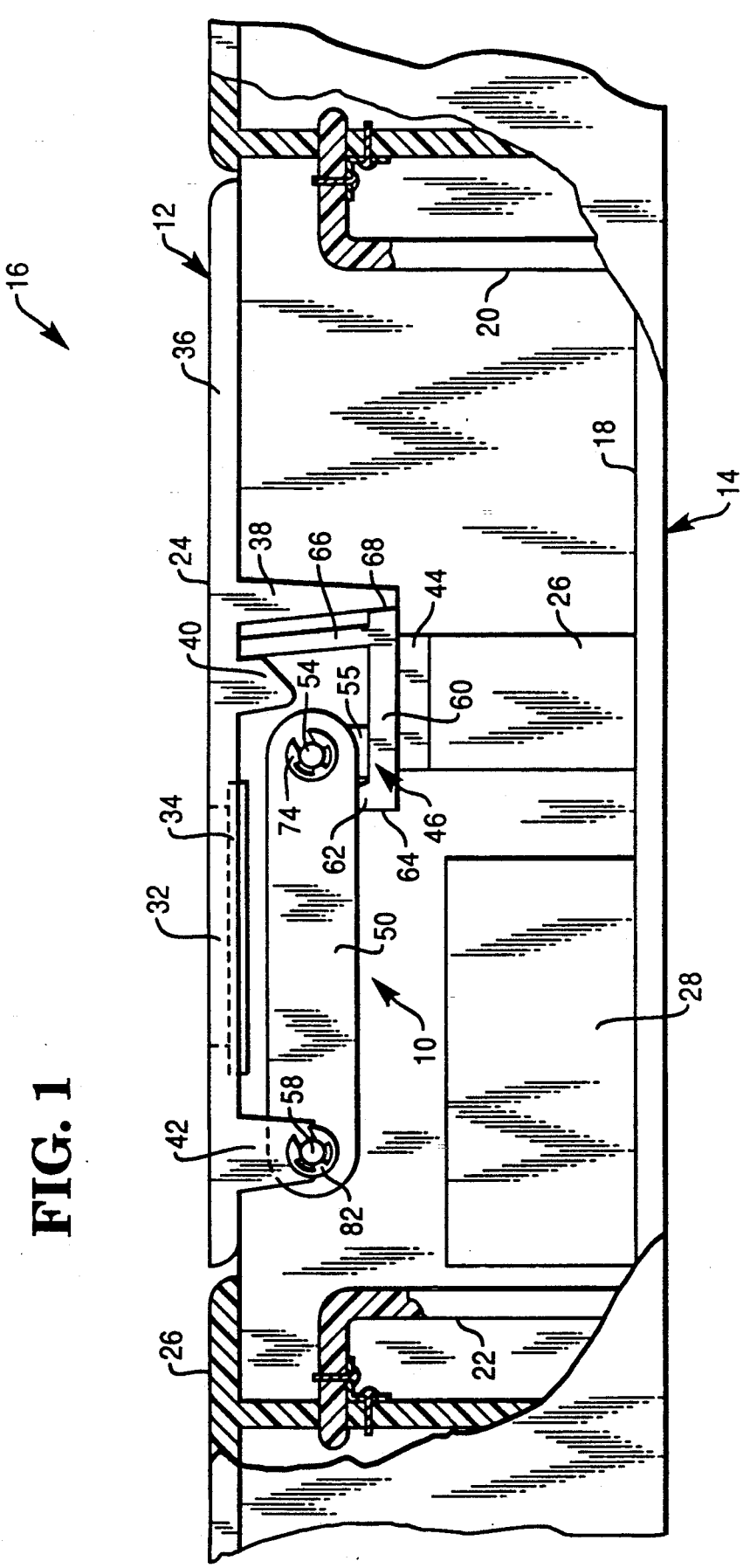
FIG. 1 is a side view of a checkout counter, including the weigh plate mounting apparatus of the present invention.

Turning now to FIG. 1, optical scanner 12 includes housing 14, which sits within checkout counter 16. Housing 14 includes lower wall 18 and side walls 20 and 22. Optical scanner 12 further includes weigh plate 24, load cell 26, and scan module 28.

Weigh plate 24 is flush-mounted with upper surface 26 of counter 16 and has an aperture 32 for passing scanning beams from scan module 28. Mounted on the underside of aperture 32 is transparent cover 34, which is typically made of glass.

Weigh plate 24 rests upon load cell 26, which produces an output signal proportional to the weight of a purchased item. Weigh plate 24 includes substantially horizontal portion 36, standing portion 38, stabilizing portion 40, and mounting portion 42. Standing portion 38 supports weigh plate 24 on upper surface 26 when weigh plate 24 is lifted to expose the inside of housing 14. Stabilizing portion 40 acts in conjunction with standing portion 38 to minimize transverse movement of weigh plate 24 and aperture 32 with respect to scan module 28. Mounting portion 42 couples weigh plate 24 to weigh plate mounting apparatus 10.

Figure 2:
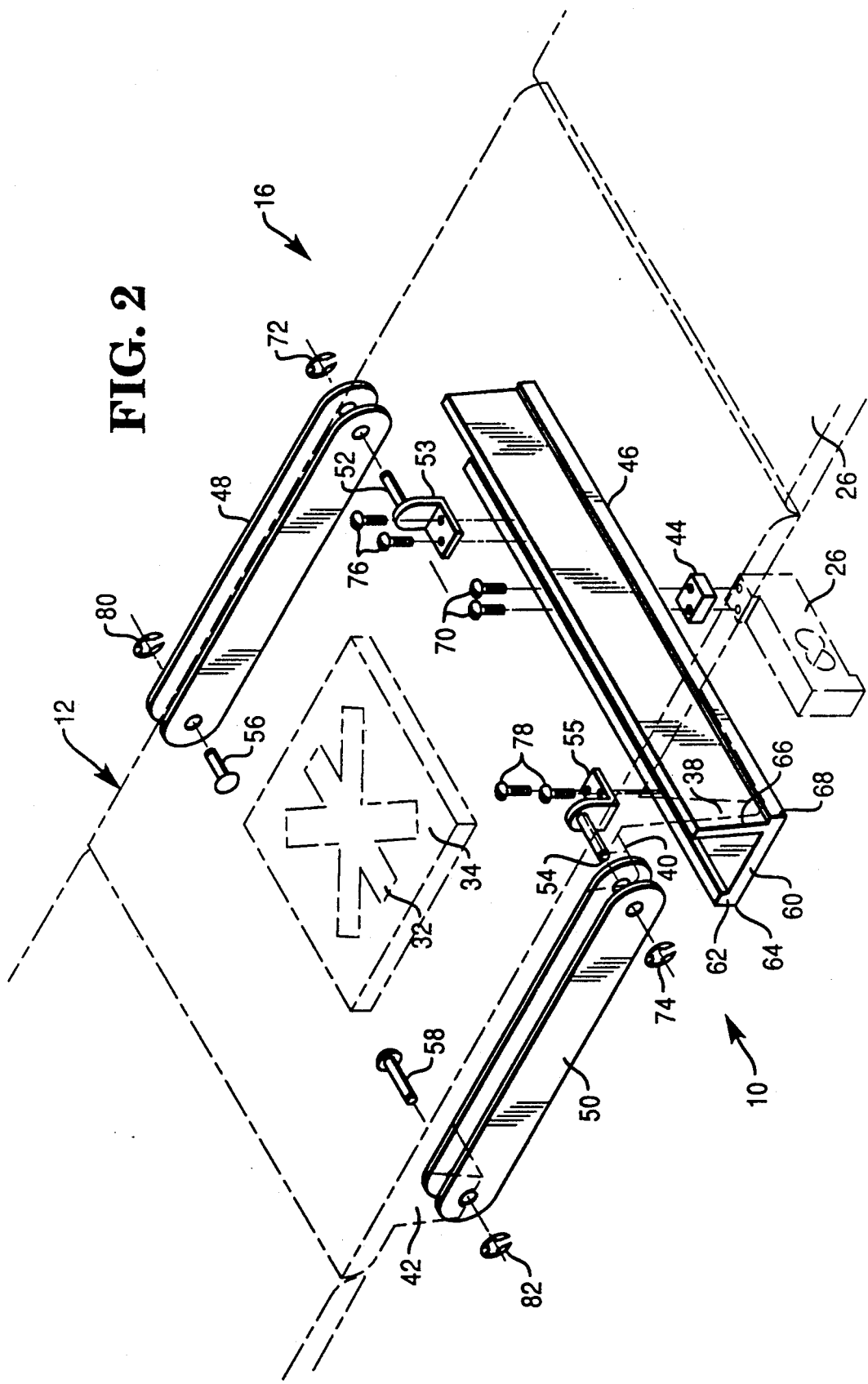
FIG. 2 is an exploded view of the weigh plate mounting apparatus of the present invention.

Weigh plate mounting apparatus 10 joins weigh plate 24 with load cell 26. As shown in FIGS. 1 and 2, weigh plate mounting apparatus 10 includes spacer 44, load distributing member 46, pivot arms 48 and 50, and pivot pins 52–58. Pivot pins 52 and 54 are mounted on pivot flanges 53 and 55. Spacer 44 rests between load distributing member 46 and load cell 26.

Load distributing member 46 includes substantially horizontal base portion 60, pivot arm limit portion 62 projecting upwardly from left end 64 of portion 60, and weigh plate support portion 66 projecting upwardly from a point near right end 68 of portion 60. Weigh plate support portion 66 abuts stabilizing portion 40 and right end 68 abuts standing portion 38. Fasteners 70 couple load distributing member 46 and spacer 44 to load cell 26.

Pivot arms 48 and 50 link weigh plate 24 to load distributing member 46. Preferably, pivot arms 48 and 50 are U-shaped to provide strength and to minimize play over time.

Pivot pins 52 and 54 join pivot arms 48 and 50 to load distributing member 46 through pivot flanges 53 and 55. Fasteners 72 and 74 retain pivot arms 48 and 50 on pivot pins 52 and 54. Fasteners 76 and 78 couple pivot flanges 53 and 55 to base portion 60 of load distributing member 46.

Pivot pins 56 and 58 couple pivot arms 48 and 50 to weigh plate 24. Fasteners 80 and 82 retain pivot arms 48 and 50 on pivot pins 56 and 58.

Figure 3:
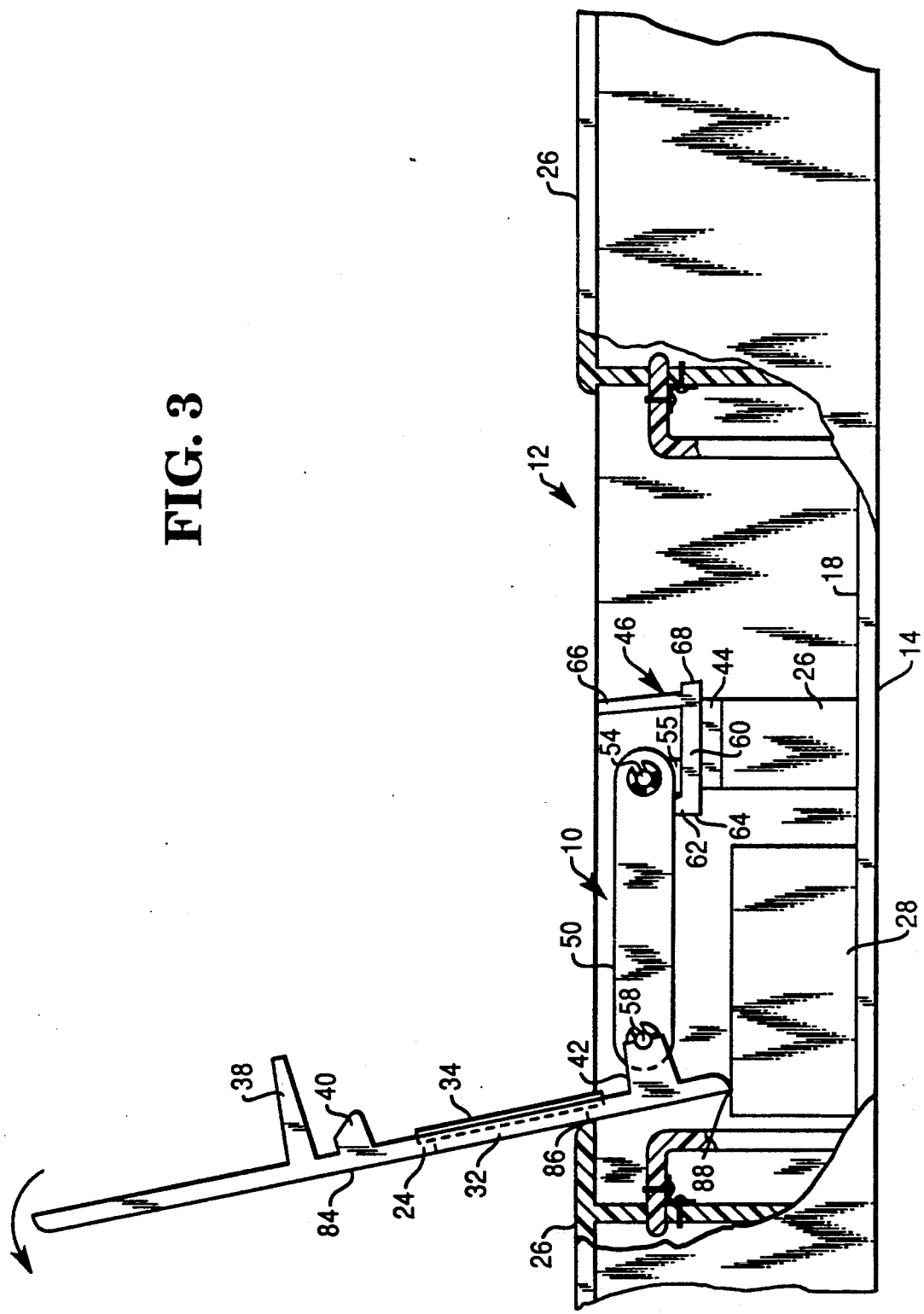
FIG. 3 is a side view of the checkout counter of FIG. 1 with the weigh plate in a first position.
Figure 4:
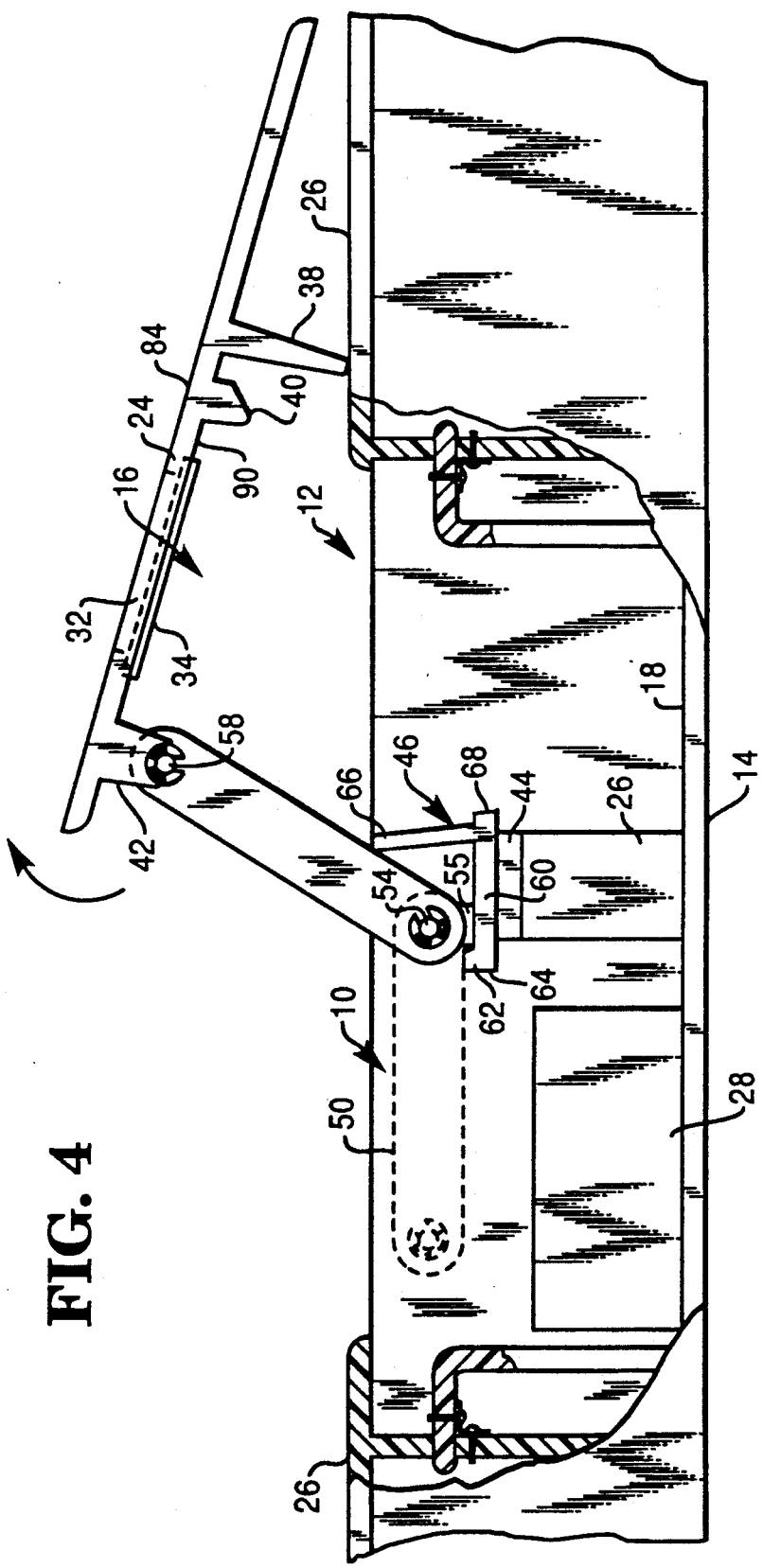
FIG. 4 is a side view of the checkout counter of FIG. 1 with the weigh plate in a second position.

Referring now to FIGS. 3 and 4, the operation of weigh plate mounting apparatus 10 is shown in more detail. In FIG. 3, gaining access to the underside of weigh plate 24 for cleaning transparent cover 34 involves raising weigh plate 24 about pivot pins 56 and 58 more than ninety degrees in a counter-clockwise direction until weigh plate 24 reaches a a stable hands-off position. As shown in scanner 12 of FIG. 3, upper surface 84 of weigh plate 24 may lean against edge 86 of upper surface 26 of checkout counter 16 and left edge 88 of weigh plate 24 may rest on scan module 28. Pivot arms 48 and 50 preferably come to rest before reaching pivot arm limit portion 62. However, other types of scanners may include different hands-off resting positions which are also envisioned by the present invention.

In FIG. 4, gaining access to scan module 28 involves raising weigh plate 24 about pivot pins 56 and 58 in a counter-clockwise direction and raising pivot arms 48 and 50 about pivot pins 52 and 54 more than ninety degrees in a clockwise direction until pivot arms 48 and 50 leans against support portion 66 of load support member 46 and standing portion 38 of weigh plate 24 comes to rest on top of upper surface 26 of checkout counter 16. Other types of scanners may include different hands-off resting positions which are also envisioned by the present invention. For example, underside 90 of weigh plate 24 may come to rest on top of counter 26 for deep scanner housings.

Advantageously, weigh plate mounting apparatus 10 offers quick hands-free access for cleaning or for scan module removal without removal of fasteners or housing 14.

Although the invention has been described with particular reference to certain preferred embodiments thereof, variations and modifications of the present invention can be effected within the spirit and scope of the following claims.

What is claimed is:

1. A weigh plate mounting apparatus for an optical scanner comprising:
   a load distributing member;
   a pivot arm having first and second ends;
   means for pivotally coupling the pivot arm at the first end to the load distributing member; and
   means for pivotally coupling the pivot arm at the second end to the weigh plate.

2. The weigh plate mounting apparatus as recited in claim 1, in which the weigh plate is rotatable to provide access to the underside of the weigh plate and to a scan module within the scanner without removal of fasteners.

3. The weigh plate mounting apparatus as recited in claim 1, further comprising:
   another pivot arm having first and second ends; and
   means for pivotally coupling the other pivot arm at the first end to the load distributing member;
   means for pivotally coupling the other pivot arm at the second end to the weigh plate.

4. The weigh plate mounting apparatus as recited in claim 3, further comprising a spacer between the load distributing member and a weight measuring device within the scanner, the spacer having a predetermined height which is operative to raise the weigh plate to a position flush with a checkout counter in which the scanner is installed.

5. The weigh plate mounting apparatus as recited in claim 4, wherein the weigh plate sits substantially parallel to and above the one and the other pivot arms in a closed position.

6. The weigh plate mounting apparatus as recited in claim 5, wherein the weigh plate is rotatable in a first direction about the second end of the one and the other pivot arms for exposing the underside of the weigh plate, the weigh plate reaching a first hands-free position against a first side of the counter.

7. The weigh plate mounting apparatus as recited in claim 6, wherein the one and the other pivot arms are rotatable in a second direction about the load distributing member for exposing the scan module, the weigh plate reaching a second hands-free position against a second side of the counter.

8. The weigh plate mounting apparatus as recited in claim 7, wherein the load distributing member comprises:
   a base portion having first and second ends;
   a weigh plate support portion extending upwardly from the base portion at a point near the first end; and
   a pivot arm support portion extending upwardly from the base portion at a point near the second end and extending laterally beneath the one and the other pivot arms.

9. The weigh plate mounting apparatus as recited in claim 7, wherein the one and the other pivot arms comprise U-shaped members.

10. The weigh plate mounting apparatus as recited in claim 7, wherein the means for pivotally coupling the one and the other pivot arms at the first ends comprise:
    a flange including vertical and horizontal portions;
    means for fastening the horizontal portion to the load distributing member;
    a pivot pin extending perpendicularly from the vertical portion; and
    means attached to the end of the pivot pin for retaining the pivot arm on the pivot pin.

11. The weigh plate mounting apparatus as recited in claim 7, wherein the means for pivotally coupling the one and the other pivot arms at the second ends comprise:
    a pivot pin; and
    means attached to the end of the pivot pin for retaining the pivot arm and the weigh plate on the pivot pin.

12. A weigh plate mounting apparatus for an optical scanner comprising:
    a pair of pivot arms having first and second ends;
    a load distributing member including a base portion having first and second ends, a weigh plate support portion extending upwardly from the base portion at a point near the first end, and a pivot arm support portion extending upwardly from the base portion at a point near the second end and extending laterally beneath the pivot arms;
    means for pivotally coupling the pivot arms at their first ends to the load distributing member including a pair of flanges, each flange including vertical and horizontal portions, means for fastening the horizontal portion to the load distributing member, a pivot pin extending perpendicularly from the vertical portion, and means attached to the end of the pivot pin for retaining the pivot arms on the pivot pins;

means for pivotally coupling the pivot arms at their second ends to the weigh plate including, for each pivot arm, a pivot pin and means attached to the end of the pivot pin for retaining the pivot arm and the weigh plate on the pivot pin; and a spacer between the load distributing member and a weight measuring device within the scanner, the spacer having a predetermined height which is operative to raise the weigh plate to a position flush with a checkout counter in which the scanner is installed;

wherein the weigh plate mounting apparatus is rotatable to provide access to the underside of the weigh plate and to a scan module within the scanner without removal of fasteners;

wherein the weigh plate sits substantially parallel to and above the pivot arms in a closed position;

wherein the weigh plate is rotatable in a first direction about the second ends of the pivot arms for exposing the underside of the weigh plate, the weigh plate reaching a first hands-free position against a first side of the counter;

wherein the pivot arms is rotatable in a second direction about the load distributing member for exposing the scan module, the weigh plate reaching a second hands-free position against a second side of the counter.

13. A method for mounting a weigh plate to a scanner comprising the steps of:
    (a) pivotally coupling the weigh plate to a first end of a pivot arm;
    (b) pivotally coupling a second end of the pivot arm to a load distributing member; and
    (c) rigidly coupling the load distributing member to a weight measuring device within the scanner.

14. The method as recited in claim 13, wherein step c comprises the substep of:
    (d) placing a spacer between the load distributing member and the weight measuring device, the spacer having a height sufficient to raise the weigh plate to a position flush with a checkout counter in which the scanner is located.

15. A method for removing a weigh plate from a scanner comprising the step of:
    (a) rotating the weigh plate in a first direction about a first pivot point at one end of a pivot arm attached to the weigh plate.

16. The method as recited in claim 15, further comprising the step of:
    (b) resting the weigh plate in a hands-free position against a first side of a checkout counter in which the scanner is mounted.

17. The method as recited in claim 15, further comprising the steps of:
    (b) lifting the weigh plate; and
    (c) rotating the pivot arm in a second direction about a second pivot point at the other end of the pivot arm coupled to a load distributing member rigidly mounted within the scanner.

18. The method as recited in claim 17, further comprising the steps of:
    (d) resting the weigh plate in a hands-free position against a second side of a checkout counter in which the scanner is mounted.

* * * * *